Feb. 18, 1930. C. E. WISE 1,747,748
SAFETY VALVE FOR GAS BURNERS
Filed June 16, 1928
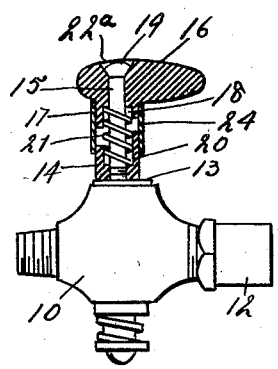
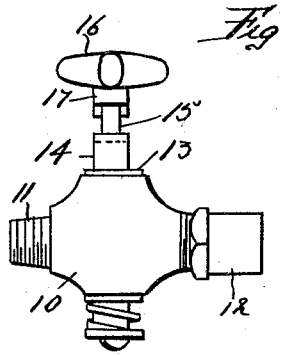
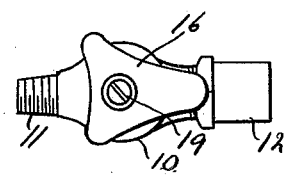
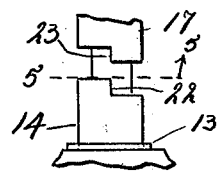
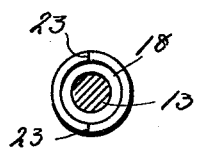
Inventor
Charles E. Wise
By W. W. Williamson Patented Feb. 18, 1930

1,747,748

UNITED STATES PATENT OFFICE

CHARLES E. WISE, OF PHILADELPHIA, PENNSYLVANIA

SAFETY VALVE FOR GAS BURNERS

Application filed June 16, 1928. Serial No. 285,948.

My present invention relates to a new and useful improvement in safety valves for gas burners and has for its object to provide a simple, cheap and effective device of this description in which a specially constructed stem and handle permits the valve to be turned to any desired position to turn on, shut off or regulate the flow of the gas, after which the handle will be automatically unclutched from the valve in order that the latter may not thereafter be accidentally revolved.

With these and other objects in view, this invention consists in the details of construction and combination of elements hereinafter set forth and then specifically designated by the claim.

In order that those skilled in the art to which this invention appertains may understand how to use and make the same, I will describe its construction in detail, referring by numerals to the accompanying drawings forming a part of this application, in which:

Fig. 1, is a side elevation of a locking valve for gas burners, the stem and handle being sectioned to show the working parts.

Fig. 2, is a view similar to Fig. 1, the parts all in elevation, the housing and spring being omitted and the handle set at right angles to the position thereof shown in Fig. 1.

Fig. 3, is a plan view of Fig. 1.

Fig. 4, is a fragmentary view of the stem and shank of the handle.

Fig. 5, is a section at the line 5—5 of Fig. 4.

In carrying out my invention as herein embodied, 10 represents the body of a valve such as is usually used in connection with gas stove and other gas burning appliances, and is provided with an inlet 11 for connection with a pipe or manifold, and an outlet 12 for co-operation with the usual burner.

13 represents the valve plug fitted to revolve in the body 10 in the usual manner and having the stem 14. In this stem is formed a threaded hole into which the lower end of the stud 15 is threaded.

16 represents the handle having a shank 17, the shank being recessed as indicated at 18, for the purpose hereinafter explained.

The handle 16 has a hole formed therethrough concentric with the recess 18 and through this hole passes the stud 15, said stud having the slotted head 19 for retaining the handle thereon as clearly shown in Fig. 1.

The stem 14 also has a recess 20 formed therein, and in this recess and the recess 18 the ends of the spring 21 are seated, by which arrangement the handle 16 is normally held in its elevated position on the stud, the head of said stud seating in the counter sunk recess 22$^a$.

A portion of the stem is cut away to form the locking shoulders 22, and a portion of the shank is likewise cut away to form the locking shoulders 23; the shoulders on the shank coacting with the shoulders upon the stem to lock the two together when the handle 16 is depressed against the action of the spring 21, so that when it is desired to turn the plug 13, the handle is depressed against the spring until the shoulders engage with the shoulders 22 when by turning the handle in either direction, the plug will likewise be turned. Upon the release of the handle it will be forced upward by the spring disengaging the shoulders and thereafter leaving the handle free to turn upon the stud 15 so that the plug may not be turned by any accidental turning of the handle.

The handle 16 is especially designed and adapted for this class of valves and is tripointed, one of said points being longer than the other so as to indicate the position of the shoulders 23 relative to the handle for facilitating the engagement of said shoulders with the shoulders 22.

24 represents a tubular housing which is fitted over the spindle and shank and may be secured to the shank. It is left free to slide upon the stem so as not to interfere with the vertical movements of the handle.

This form of my invention is simple of construction and effective in action and easily repaired since the spring which is the most likely to deteriorate by long use may be readily replaced by backing off the stud 15, thus permitting the removal of the handle and housing after which a new spring may be inserted and the stud replaced.

Of course I do not wish to be limited to the exact details of construction as herein shown, as these may be varied within the limits of the appended claim without departing from the spirit of my invention.

Having thus fully described my invention, what I claim as new and useful is:—

A safety valve for gas burners comprising a body, a plug coacting with said body for turning on or shutting off the flow of gas, a stem carried by the plug, said stem having a recess in the upper end thereof, a stud threaded into the stem, a handle pivoted upon said stud, a shank formed with the handle, said shank having a recess therein, a spring, one end of which is seated in the recess in the stem and the other end seated in the recess in the shank, shoulders formed upon the stem and the shank adapted to coact to form a lock between the stem and the shank, and a housing carried by the shank and adapted to slide upon the stem for enclosing the locking shoulders and the spring.

In testimony whereof, I have hereunto affixed my signature.

CHARLES E. WISE.